US007454370B2

(12) United States Patent
Baril et al.

(10) Patent No.: US 7,454,370 B2
(45) Date of Patent: Nov. 18, 2008

(54) ELECTRONIC MENU APPARATUS AND METHOD OF ORDERING USING ELECTRONIC MENU APPARATUS

(75) Inventors: Daniel Joseph Baril, Hampton, NH (US); Raymond Joseph Barbuto, Dagsboro, DE (US); Thomas Joseph Druan, Arlington, VA (US)

(73) Assignee: E-Meal, LLC, Haverhill, MA (US)

( * ) Notice: Subject to any disclaimer, the term of this patent is extended or adjusted under 35 U.S.C. 154(b) by 0 days.

(21) Appl. No.: 11/940,303

(22) Filed: Nov. 14, 2007

(65) Prior Publication Data

US 2008/0126220 A1  May 29, 2008

Related U.S. Application Data

(63) Continuation-in-part of application No. 11/774,611, filed on Jul. 8, 2007, which is a continuation-in-part of application No. 11/757,998, filed on Jun. 5, 2007, now abandoned.

(60) Provisional application No. 60/867,740, filed on Nov. 29, 2006.

(51) Int. Cl.
*G06Q 30/00* (2006.01)

(52) U.S. Cl. ................................ 705/26; 705/1; 705/15; 705/27; 186/38; 186/39

(58) Field of Classification Search .................. 705/26, 705/27, 1, 15; 186/38, 39; 462/17–24, 55–63; 715/810–845; 434/178, 317; 281/15–44
See application file for complete search history.

(56) References Cited

U.S. PATENT DOCUMENTS 5,534,888 A * 7/1996 Lebby et al. ................ 345/672

| 6,788,283 | B1 * | 9/2004 | Blotky et al. ............... 345/156 |
| 6,968,151 | B2 | 11/2005 | Redford et al. |
| 2003/0046166 | A1 * | 3/2003 | Liebman ...................... 705/15 |
| 2003/0050854 | A1 * | 3/2003 | Showghi et al. ............... 705/26 |
| 2003/0078793 | A1 * | 4/2003 | Toth ............................ 705/1 |
| 2004/0143503 | A1 | 7/2004 | Suthar |

(Continued)

FOREIGN PATENT DOCUMENTS

EP    1746484 A1    1/2004

(Continued)

OTHER PUBLICATIONS

"eMenus: The Future is NOW!" Michael L. Kasavana, Club Management; Oct. 2004; 83, 5; Accounting & Tax Periodicals, pp. 118-127. Retrieved via Proquest on Dec. 13, 2007.*

(Continued)

*Primary Examiner*—Jeffrey A. Smith
*Assistant Examiner*—Michael A. Misiaszek
(74) *Attorney, Agent, or Firm*—Grossman Tucker Perreault & Pfleger PLLC

(57) ABSTRACT

A remote ordering system is provided using an electronic menu having a series of input devices corresponding to various menu items aligned with the input devices, and a wireless transmitter to send selected menu items to a receiving device for processing. A display to show selected menu items, an alpha-numeric keyboard, a non-cash payment device, and a printer for receipts are also contemplated for increased functionality.

18 Claims, 17 Drawing Sheets

U.S. PATENT DOCUMENTS

| | | | |
|---|---|---|---|
| 2005/0049940 A1 | 3/2005 | Tengler et al. | |
| 2005/0071232 A1 | 3/2005 | Frater | |
| 2007/0061209 A1* | 3/2007 | Jackson | 705/15 |
| 2007/0144835 A1* | 6/2007 | Zhang | 186/39 |
| 2008/0032276 A1* | 2/2008 | Zheng | 434/317 |

FOREIGN PATENT DOCUMENTS

| | | | |
|---|---|---|---|
| EP | 1746484 A1 * | 1/2007 | |
| WO | 2005015463 A1 | 2/2005 | |
| WO | WO 2005015463 A1 * | 2/2005 | |

OTHER PUBLICATIONS

"Motion Computing Serves Up Tablet PC 'E-Menu' for Holiday Inn Restaurants." Business Wire, New York: Jun. 22, 2004, p. 1. Retrieved via Proquest on Dec. 13, 2007.*

"Technology at the Table," Felix Sanchez, Press-Telegram, Long Beach, California, Nov. 4, 2006. Retrieved via Proquest on Dec. 13, 2007.*

International Search Reported and Written Opinion mailed May 21, 2008 issued in PCT Application No. PCT/2007/088199, 15 pages.

U.S. Appl. No. 11/774,611, filed Jul. 8, 2007.

U.S. Appl. No. 11/757,998, filed Jun. 5, 2007.

U.S. Appl. No. 60/867,740, filed Nov. 29, 2006.

* cited by examiner

ELECTRONIC MENU APPARATUS AND METHOD OF ORDERING USING ELECTRONIC MENU APPARATUS

CROSS REFERENCE TO RELATED APPLICATION

This application is a continuation-in-part of U.S. Nonprovisional patent application Ser. No. 11/774,611, titled "Remote Ordering System" filed Jul. 8, 2007, which is a continuation-in-part of U.S. Nonprovisional patent application Ser. No. 11/757,998, titled "Remote Ordering System" filed Jun. 5, 2007, which claims benefit of U.S. Provisional Patent Application Ser. No. 60/867,740, titled "Remote Ordering System" filed Nov. 29, 2006.

FIELD OF TECHNOLOGY

The present invention relates generally to remote ordering systems, and more particularly the invention relates to a remote ordering system that combines the utilization of electronic and traditional printed menus having at least one page of items, selection switches to select the items, and a transmitter to send an order including the selected items to a receiving device to process the order.

BACKGROUND

Ordering from a menu typically includes reading from the menu and making a selection that must be remembered while waiting for an employee to come over and transcribe the order to a piece of paper. After the employee takes the order, the piece of paper is delivered to an order processing area to process the selections. The employee then delivers the selections, and at some later time, the employee must be present to receive payment for the selections. This reliance on the employee to deliver the order and be present for payment can significantly slow the ordering and payment process. The desire for more efficient order management and a streamlined customer experience has therefore led to the development of the present inventive concept.

Current methods for addressing aspects of ordering or payment fall short. Some current remote ordering systems utilize electronic menus that suffer from undesirable complexity and high cost. An example is an electronic menu that consists primarily of a tablet personal computer (tablet pc) having a large touch-screen display on which all menu options and ordering icons are displayed. The touch-screen is typically made of transparent touch-panels overlaying a liquid crystal display to provide an interactive digitized menu interface. The tablet pc is made to be a robust computing machine capable of tasks such as word processing, spreadsheet manipulation, or virtually any other software need relying on considerable operating system, processing and memory requirements. The adoption for use in menu-ordering is therefore typically a software program running through a standard operating system such as WINDOWS. This reliance on an underlying operating system to run menu applications can make the platform unstable and susceptible to crashing.

Another drawback to current electronic menus is that complex electronic devices such as tablet pc's are costly to manufacture and repair, and are susceptible to damage. The touch-panels and screens are typically layered glass or other brittle materials, and could shatter if dropped, bent, or if too much force is applied, such as one's elbow being placed on the screen. Tablet pc's are generally not manufactured to be water resistant, and can be easily damaged by liquids or food items.

Power requirements of tablet pc's are also a concern. Backlighting requirements as well as substantial processor and memory requirements of the prior art menus require significant power to run. A drawback of increased power requirements is the production of significant heat that requires active cooling to dissipate it. Cooling devices for internal components use venting to accommodate air exchange to the interior of the devices. That venting can provide openings for spilled beverages, cleaning supplies, or any other liquid to enter the devices and damage or destroy it.

SUMMARY

An ordering system that empowers a customer with the ability to order and pay without the need of an employee or other wait-staff is the focus of the present invention.

The present inventive concept is primarily directed at a remote ordering system using an electronic menu that overcomes the undesirable standoffish, fragile, and vulnerable characteristics of other proposed solutions.

In particular, the invention relates to an apparatus comprising at least one page listing a plurality of items; an input means for selecting one of the items; and a feedback means for confirming selection of the item.

The invention also relates to an electronic menu comprising: a series of pages listing menu items; a grouping of input devices that correspond to the locations of menu items on a page; and a display device for displaying information regarding input from the input devices.

The invention further relates to a method of ordering comprising: opening a menu having at least one menu page, an input device, and a feedback mechanism; turning to a desired page of the menu; selecting an item from the menu using the input device; confirming a menu item was selected by referencing the feedback mechanism; and sending the selected items to a remote location for processing.

BRIEF DESCRIPTION OF THE DRAWINGS

These and other features and advantages of the present invention will be better understood upon consideration of the following detailed description, taken in conjunction with the accompanying drawings, in which like reference characters refer to like parts throughout, and in which.

DETAILED DESCRIPTION OF THE PREFERRED EMBODIMENTS

The present invention relates to any type of remote ordering device.

Figure 1:
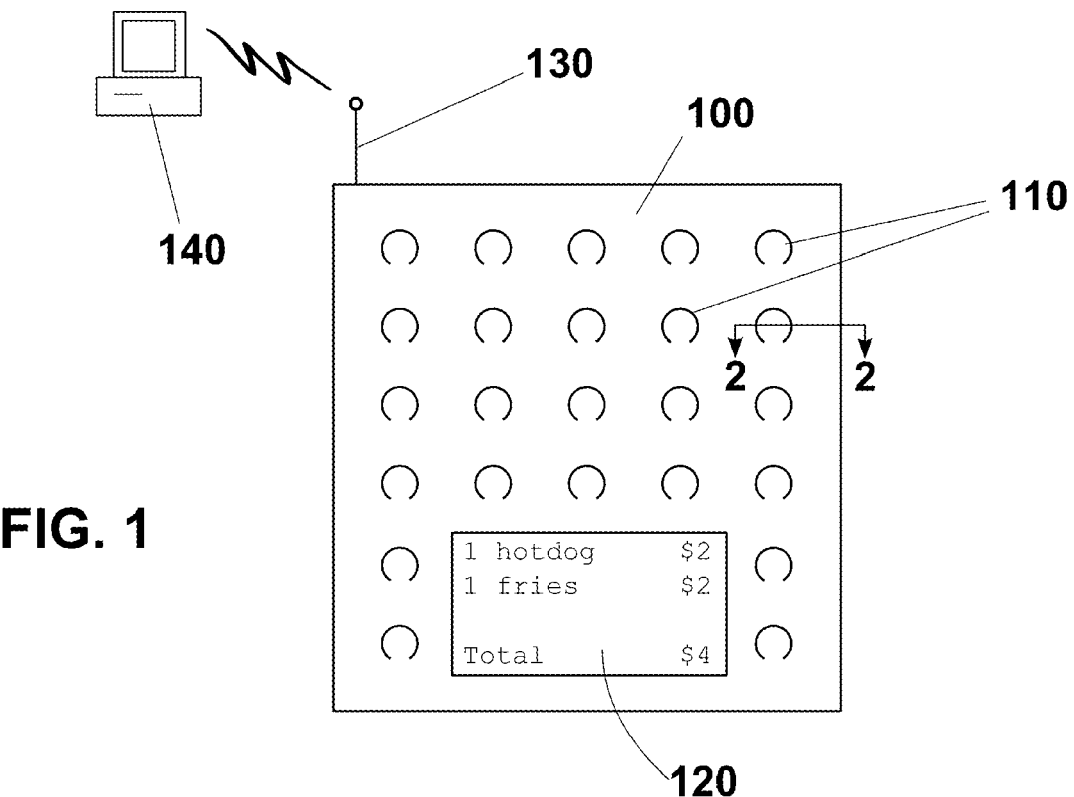
FIG. 1 shows a front view of a preferred embodiment of the invention.

In one preferred embodiment, the inventive concept relates to an electronic food menu 100 with selection means 110 in the form of membrane switches, a display 120, and a remote transmitting device 130, as seen in FIG. 1. A graphical overlay (not shown) is preferably printed upon the menu 100 overlaying the selection means 110 to provide various selections.

When a customer is seated at a table, the menu 100 is made available to them either from the wait staff or from a docking station at the table. A food selection is made by utilizing a series of selection means 110 that correspond to selections for a desired meal. Separate selection means 110 can be included on the menu and be designated with appropriate markings to accomplish tasks such as signifying a completed order or calling a server to the table or to cycle through various other functions of the menu. The graphical overlay can be periodically replaced to reflect new selection options, and the membrane switch designations can be updated accordingly with appropriate software. Once the order is complete, the ordering information is sent to a receiving device for processing.

Figure 2:
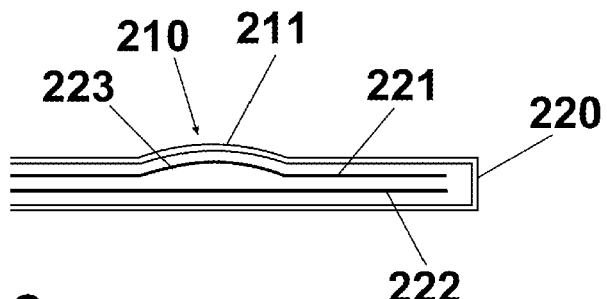
FIG. 2 shows a cross section of a portion of the preferred embodiment of FIG. 1 along line 2-2.

A preferred embodiment of the selection means 110 is a membrane switch 210 shown in cross-sectional detail in FIG. 2. FIG. 2 shows a coating layer 220 wrapping around the edges of the menu. While the coating layer is shown as a continuous unitary layer, various sealing methods can be employed at the edge to join two or more layers of coating material together to form a liquid-resistant barrier. Membrane switch 210 is made of a first conductive material 221, a second conductive material 222, and a switch portion shown as an elevated pressing portion 211 of outside coating 220 and corresponding biased region 223 of first conductive material 221. When the pressing portion 211 is depressed by a user, the biased region 223 of first conductive material 221 comes into contact with the second conductive material 222 and a selection is sensed. The membrane switches can further be provided with a visual feedback device (not shown), such as an LED, movable graphic, or other visual indexing apparatus, to show that a particular membrane switch 210 has been selected, and in some circumstances, how many times the membrane switch 210 has been depressed, for example, to indicate a desired quantity of a desired menu item. This visual feedback device may be employed with or without a separate display. Other configurations having similar functionality to the above described membrane switch, such as a membrane switch having a flat or concave pressing portion that is depressed to activate the switch, are also contemplated.

Figure 3:
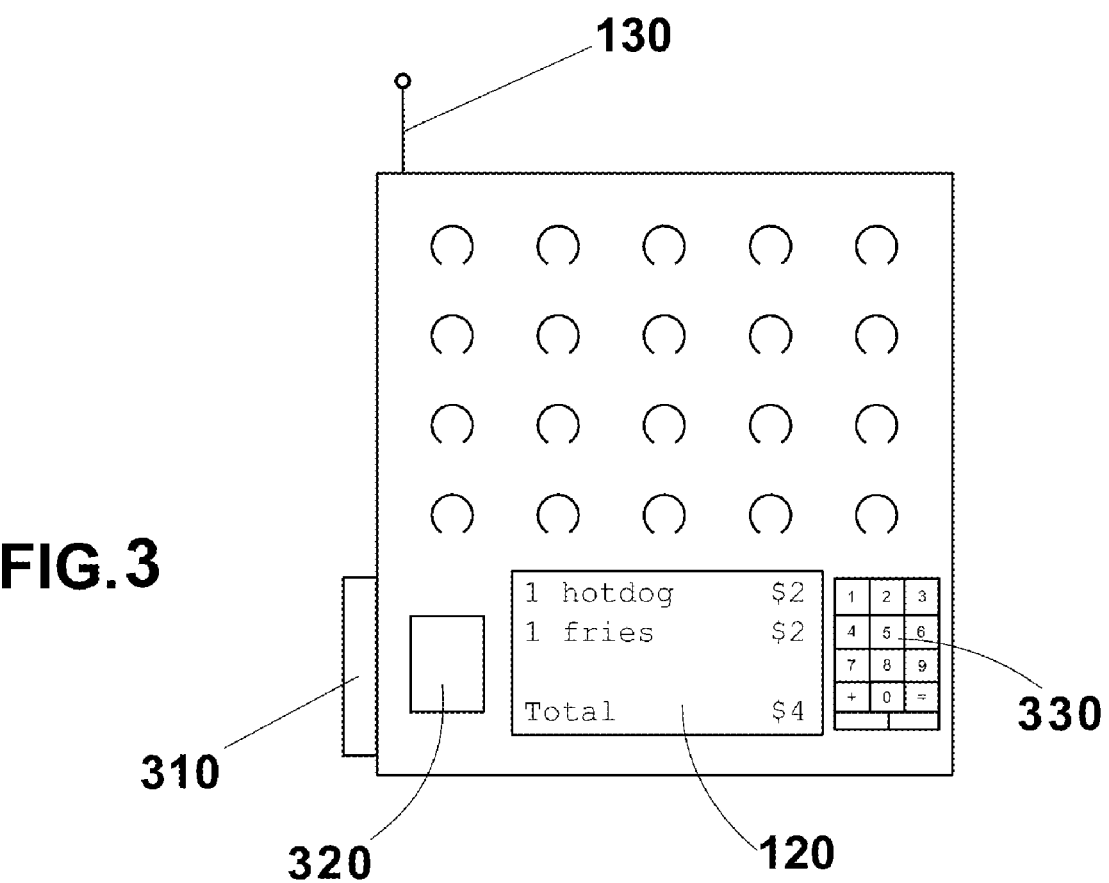
FIG. 3 shows a front view of a second preferred embodiment of the invention.

The remote transmitting device 130 is shown in FIGS. 1 and 3 as an external antenna; however, as an alternative to or in conjunction with the external antenna, an internal antenna, docking station, network cable (such as a phone line or Ethernet cable), or infrared transmitter can also be used. The remote transmitting device can use wireless data transmission such as infrared beam or radio waves (including typical 802.11 standards, BLUETOOTH technology, or cellular phone bandwidth) or wired data transmission to send an order, along with identifying information such as name, table number or general location, to a receiving device 140 located, for example, in a food preparation area of a restaurant, to an inventory location, or to a wait-staff location. The receiving device can be a standard personal computer running a software program to receive and process orders sent from the electronic menus, or it can be a specialized device developed solely for use with the electronic menus. Additionally, the menu's can communicate with other menus, providing an ability to send messages, pay for all or just selected items, play games, or otherwise interact.

In a further embodiment shown in FIG. 3, the remote ordering system can include a payment means 310, a printer 320, or an alpha-numeric keyboard 330. The alpha-numeric keyboard 330 as seen in FIG. 3 can be used to enter various information regarding the meal including special instructions, requests, or comments. Also, the alpha-numeric keyboard 330 can be used to accommodate any of the various functions described above in conjunction with the display 120. Printer 320 can be part of the menu itself or located at the table. Printer 320 can be used for printing receipts, coupons, or other desirable printed material. Printer 320 can be a simple receipt printer for providing the customer a hard copy of their order. The printer can be directly attached to the menu, as shown in FIG. 3, or a separate device at the customer's table or at some remote location.

Payment means 310 will be described in more detail in conjunction with the following embodiment.

In a third preferred embodiment shown in FIGS. 4-18, the invention relates to an electronic menu 400 having a plurality of menu pages 460 with menu items 500 listed thereon (see FIG. 5), a series of selection means 440 to select items listed on the menu pages 460, and a display 480 to provide visual feedback of the selected items. Menu pages 460 are held in menu 400 by rings 430, or any other known page retention solutions. Menu pages 460 are preferably separated into sections labeled with tabs 450. The sections can include items such as Beverages, Appetizers, Salads, Specials, Entrees, Soups, Pizza, Pasta, Dessert, or any other grouping of items, food related or otherwise.

Menu 400 can employ an external antenna similar to remote transmitting device 130 shown in FIG. 1 and FIG. 3. As an alternative to or in conjunction with the external antenna, an internal antenna, docking station, network cable (such as a phone line or Ethernet cable), or infrared transmitter can also be used. The remote transmitting device can use wireless data transmission such as infrared beam or radio waves (including but not limited to typical 802.11 standards, 802.05 standards, BLUETOOTH technology, or cellular phone bandwidth) or wired data transmission to send an order, along with identifying information such as name, table number or general location, to a receiving device 140. Menu identification can be accomplished by having each menu appending a unique menu identification number to an order. Alternatively, a menu can be actively identified by user input, GPS triangulation, wireless triangulation, RFID transmission, or IP address.

The remote transmitting device 130 communicates with receiving device 140, which can be located in a food preparation area of a restaurant, an inventory location, or a centralized wait-staff location, or to individual wait staff. The receiving device can be a standard personal computer running a software program to receive and process orders sent from the electronic menus, a beeper-type device, or a specialized device developed solely for use with the electronic menus. The communication can be one-way from the menu to the receiving device 140, or two way between the menu and a receiving device 140.

The ordering system can include a broadcast station (not shown) that can send information to the menus 400 or to receiving device 140 or to both. The information can be updated menu information, specials of the day, advertisements, or other media.

Figure 4:
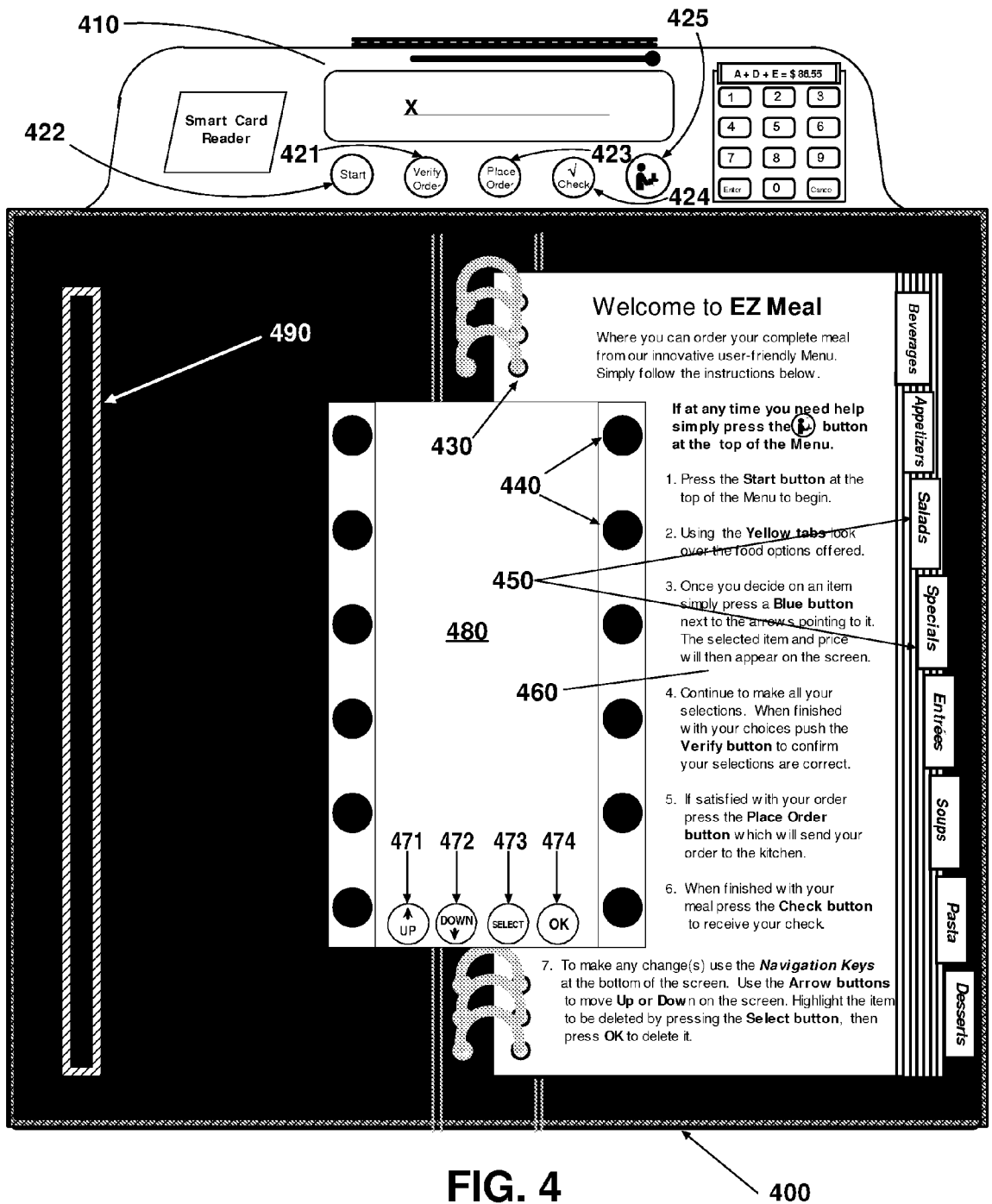
FIGS. 4-18 show a third preferred embodiment of the invention in various stages of use.

Display 120 as seen in FIG. 1 and/or display 480 as seen in FIG. 4 (hereinafter "display 120/480" can be a light emitting diode display (LED), organic light emitting diode display (OLED), a liquid crystal display (LCD), or electrophoretic display (EPD) used in e-ink or e-paper products. Display 120/480 can be color, black & white, grayscale, or a combination of displays. Display 120/480 can be provided with a backlight to increase visibility in low-light conditions. Display 120/480 can be capable of displaying text corresponding to items selected from one of the menu pages. Display 120/480 can also show item-related information such as item prices, descriptions, or meal options such as sides, toppings, dressing, or others accompaniments. The ability for display 120/480 to reproduce graphics, animations, video, etc. is also contemplated. Display 120/480 may also be flexible or rigid.

A flexible display 120/480 can preferably allow a membrane switch placed beneath the screen to be depressed by applying pressure to a portion of the screen.

In a preferred embodiment, the electronic menu includes reading lights incorporated into the menu. The reading lights can be in the form of backlighting or an attached external light that illuminates the pages of the menu for low-light visibility.

The display 120/480 provides information regarding the type of food ordered, the quantity of food ordered, and the price of the food ordered. The display 120/480 can also provide other information such as various options for food items (e.g. fries or mashed potatoes); sizes (e.g. a large soda versus a small soda); doneness (e.g. well done versus medium rare); special requests (e.g. "hold the onions"); upselling requests (e.g. "would you like a drink?"); nutritional information; allergy precautions; wait time; server name; business or advertising graphics; or any other informational or decorative indications desired. Also, the display 120/480 can be used to provide non-menu items such as games, puzzles, or trivia. The display 120/480 can furthermore be used to request information from customers regarding typical survey information drawn to the quality of the services rendered, as well as personal information to be used for marketing purposes. The display can be used to show incoming or outgoing text-messages from others within transmission range of the menu, or using pre-existing messaging services.

The menu pages can be made similar to that of standard menu pages, such as a series of printed pages listing menu items. In some embodiments, the menu items can be provided with images that further describe them. The pages can include, for example, paper or plastic sheets that can be attached directly to the menu or can be inserted or laminated in a protective sheath that is attached to the menu. The page may also be formed with e-ink or e-paper that can be updated electronically.

As seen in FIG. 4, the invention includes a page indexing means 490 for detecting to which pages 460 menu 400 is opened. Page indexing means 490 is used to update the selection means so that they correspond to new items listed on open pages 460. If the page for salads is open, selection means 440 will register to a particular salad. The selection means is likewise updated to correspond to new items listed on subsequent pages. The page-indexing means 490 includes a detector along the side or bottom of menu 400 to sense the page to which the menu is turned. Page indexing means 490 also includes some indication of page number on each page 460 such as optical, magnetic or electrical measures in each of tabs 450 or along an edge of menu page 460. When a page is turned, the selection means 440 can be updated to reflect varying items on different pages. For example, on a first page, a selection means can correspond to item A, but when the page 460 is turned, that same selection means can correspond to an item B. The page indexing means 490 can include optical sensors, magnetic switches, physical switches, etc. Page indicators, such as magnetic, reflective, mechanical, or radio-frequency measures, can be located in or on the menu page 460, laminate, or sheath. It is noted that the reflective measures used for page indexing can reflect specific wavelengths of light, such as ultraviolet, visible, microwave, or other suitable wavelength. In one embodiment, the menu can be provided with an initialization procedure whereby the locations of pages 460 can be learned by opening the menu 400, and turning the pages. Upon sensing each turned page 460 as it triggers the page indexing means 490, the menu is calibrated to the ordering of each successive menu page 460. This way, information stored in the menu's memory for Appetizers, for example, will be associated to the Appetizer's page regardless of the order in which the menu pages are assembled. Alternatively, the menu pages can be stored in a pre-set order corresponding to a pre-set storage methodology where Appetizer's, for example, must appear on a certain page number.

Figure 8:
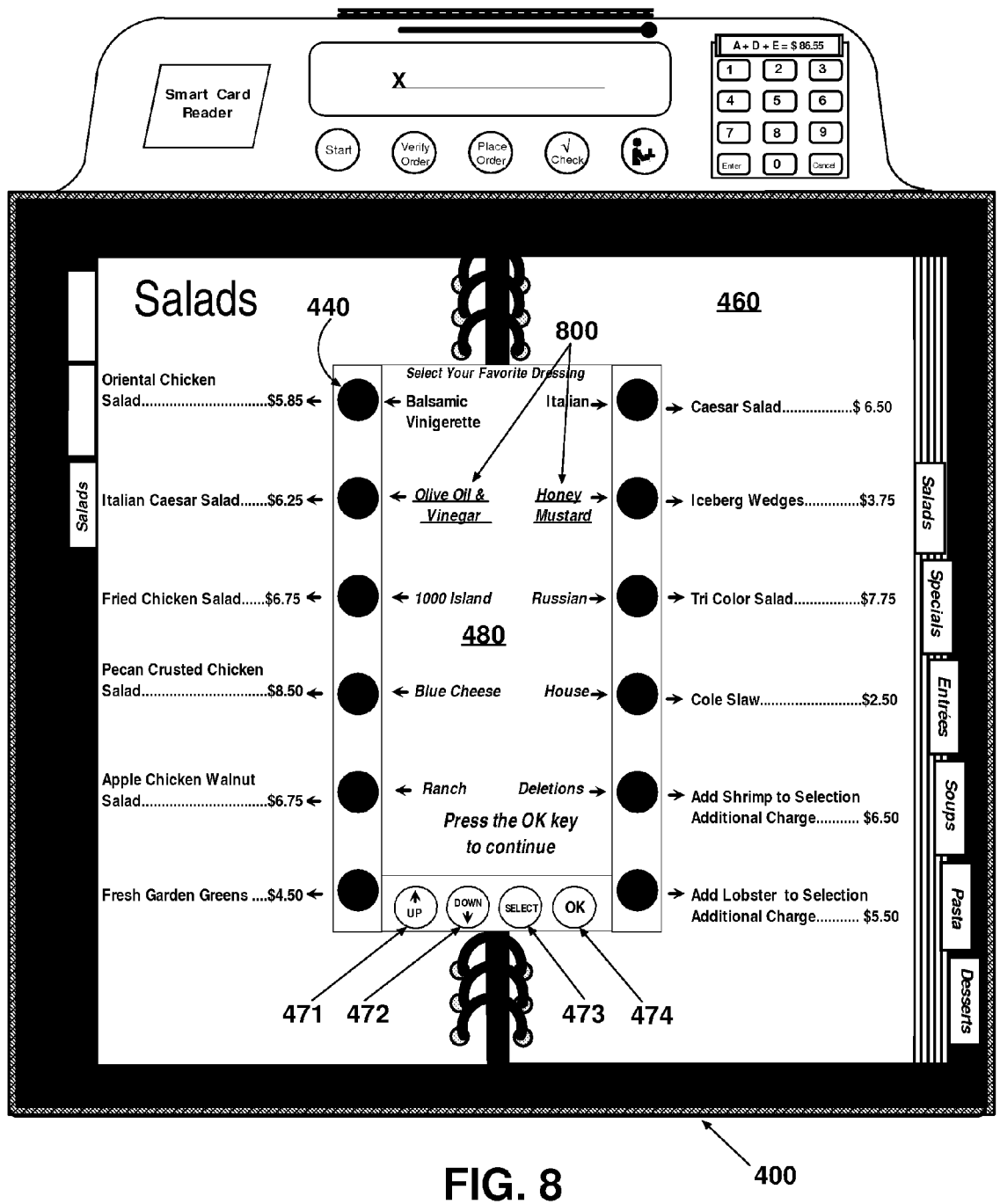

In a preferred embodiment, the selection means 440 can be situated along at least one edge of the display. As seen in FIG. 8, selection means 440 located alongside the display 480 can function to select items listed on menu items 500 located on a menu page adjacent a first portion of the selection means 440, as well as to select optional items 800 located on the display adjacent a second portion of the selection means 440.

In one embodiment, the selection means are in the form of membrane switches. The membrane switches are preferably water resistant, durable, and are able to provide tactile feedback to a user. Alternative input devices can include a joystick having a protrusion that can be manipulated in a variety of directions to correspond to selection of a menu item; a scrollwheel having a peripheral region capable of sensing rotation, where clockwise rotation scrolls through a list of items in one direction and counterclockwise rotation scrolls through the list in an opposite direction; or verbal input through a microphone and in conjunction with speech recognition software.

A set of service buttons 421-425 can be included on the menu that correspond to various functions such as initiating menu ordering 422, calling for a waiter/waitress 425, verifying an order 421, placing an order 423, or requesting a check 424. Use of these buttons will be discussed later in the specification.

Payment means 310 in FIG. 3 and/or payment means 410 in FIG. 4 (hereinafter "payment means 310/410") is used to optionally pay for items without the need for a waiter/waitress to deliver and process a check. Payment means 310/410 can include either contact or non-contact payment devices. The payment means 310/410 can accept credit, debit, or gift cards employing magnetic stripes. Alternatively, the payment device can access wireless payments from a smart-chip, such as a smart card or payment fob, or other non-contact information system such as near-field communication RFID devices, wireless or cellular payment using a stand-alone device such as a cellular phone or personal digital assistant (PDA).

In a preferred embodiment, the feedback means is a display with selection means 440 being areas on a touch screen overlaying the surface of the display that correspond to words or symbols on the display beneath the touch screen. With this configuration, the touch screen can function as a signature pad to digitally capture the customer's signature for verification or record-keeping. This digital signature may be optionally printed on a receipt or invoice to preserve a hard copy of the transaction.

Figure 16:
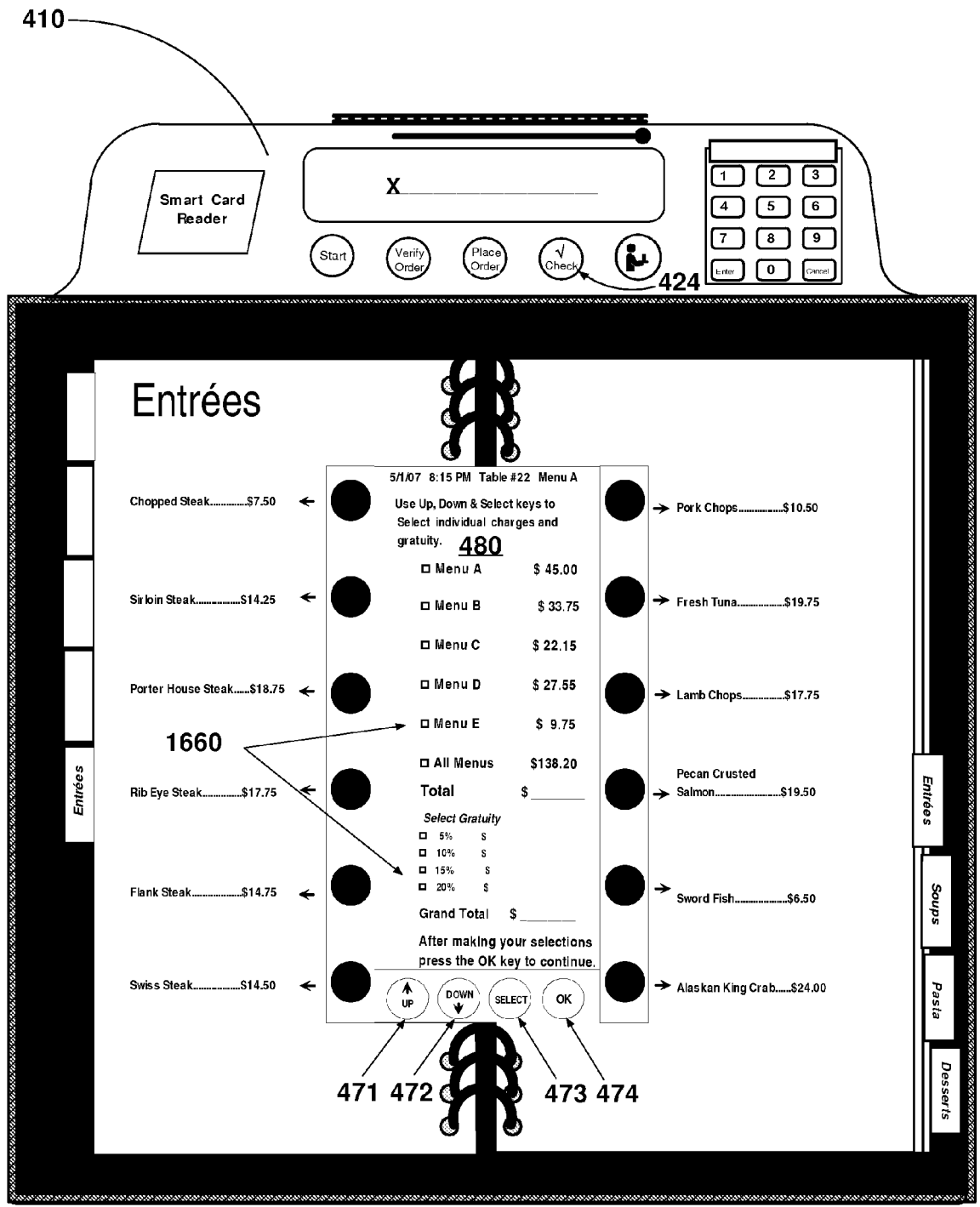

Alternatively, a resistive or conductive separate touchpad or electric signature pad 1640 as in FIG. 16 can be used to capture signatures, biometric, or forensics information. Because this input device can capture written information through a stylus 1650 or other gesture based input device, including a user's finger, it may further be used to input information not related to payment uses, such as adding special requests to an order or to fill in suggestions for the establishment.

The menu can be powered by any of a number of available methods. These available methods include wireless power, rechargeable batteries, replaceable batteries, solar power, or mechanically stored energy. In a preferred embodiment, rechargeable batteries are stored within the menu and are charged via non-contact, or inductive, charging. This is usually accomplished by having one set of coiled wire encircled by another set of coiled wire, where current flowing through one of the coils induces a current flow in the other set of coils. This induced current is then used to charge a battery. It should be noted that inductive current can be achieved using any conductive materials, and the invention involving non-contact or inductive charging is not limited to encircled coils of wire.

The menu is preferably constructed and arranged so as to be durable and rugged. Because of the use around food and drink, the display should be substantially fluid-resistant. The circuit can be sealed by a gasket or encapsulated in a fluid-resistant material. Furthermore, a flexible circuit can be used to allow for a certain degree of pliability of the menu. Similarly, the display can be made of a flexible material such, such as that used in e-ink or e-paper displays.

The menu may include audio feedback to indicate that a selection has been made, or that some other event has been triggered. This can include an incoming message from the kitchen saying the meal is ready, it can be related to advertising, it can be user-provided music from a customer's storage device, or music selected from a virtual jukebox accessible through the menu.

The menu may also provide feedback in the form of smell. Various chemicals can be released from the menu to simulate certain desired smells. These smells can correspond with food items or can be provided to deliver a certain environmental experience such as the outdoors.

The menu can provide for language options to accommodate various spoken languages. For example, the menu can include a first grouping of pages in one language followed by a second grouping of pages in a second language. Alternatively, the menu pages can be swapped out to provide alternative languages. In either case, the central display would likewise be updated depending on the language displayed on the pages.

In a preferred embodiment, the menu can be associated with a central docking station located at each table. The central docking station can provide various support functions for the menu such as printing capabilities, wired or wireless transmission means, a recharging station to recharge the menu's batteries if batteries are present, an electricity transmission means for wireless powering of the menu, and a place to store the menus when not is use.

Because the electronic menus are preferably wireless handheld devices, anti-theft means could be employed to prevent customers from leaving the restaurant with the menus. Such anti-theft devices could be radio-frequency identification (RFID) tags, tethers, location tracking to locate a menu location and an indicator of when the menu leaves a predefined area, or any other known antitheft devices employed on merchandise, clothing, or laptop computers.

A separate software program is contemplated to provide a user-friendly method of creating menu pages or a graphical overlay for an electronic menu herein described, where the program can assign new menu items to corresponding input means locations and update the menu's computer program accordingly. The updating can be achieved either wirelessly or through a physical connection, to match up with the newly printed media. The menu program can include additional functions such as a tip calculator. It should be noted that a preferred embodiment of the electronic menu of the present invention, the program used to run and update the electronic menu uses a low-level programming language such as C++ that can be stored on a chip, as opposed to an application that requires an operating system to interface with the hardware. This improves reliability, decreases required processing power and memory requirements, requires little to no cooling, and takes up less room than a typical tablet pc or laptop running an operating system.

FIGS. 4-18 show an exemplary step-by-step method of using the menu. The menu 400 can include a payment structure that allows a user to pay for a set of selected items. FIG. 4 shows the instructions for use that are printed on the back of the Beverages or first menu page 460. This is the first page a customer sees upon opening the menu 400. Subsequent pages contain the specific fare offered and navigation keys 471, 472, 473 and 474 are used to manipulate and/or select information displayed on display 480.

Figure 5:
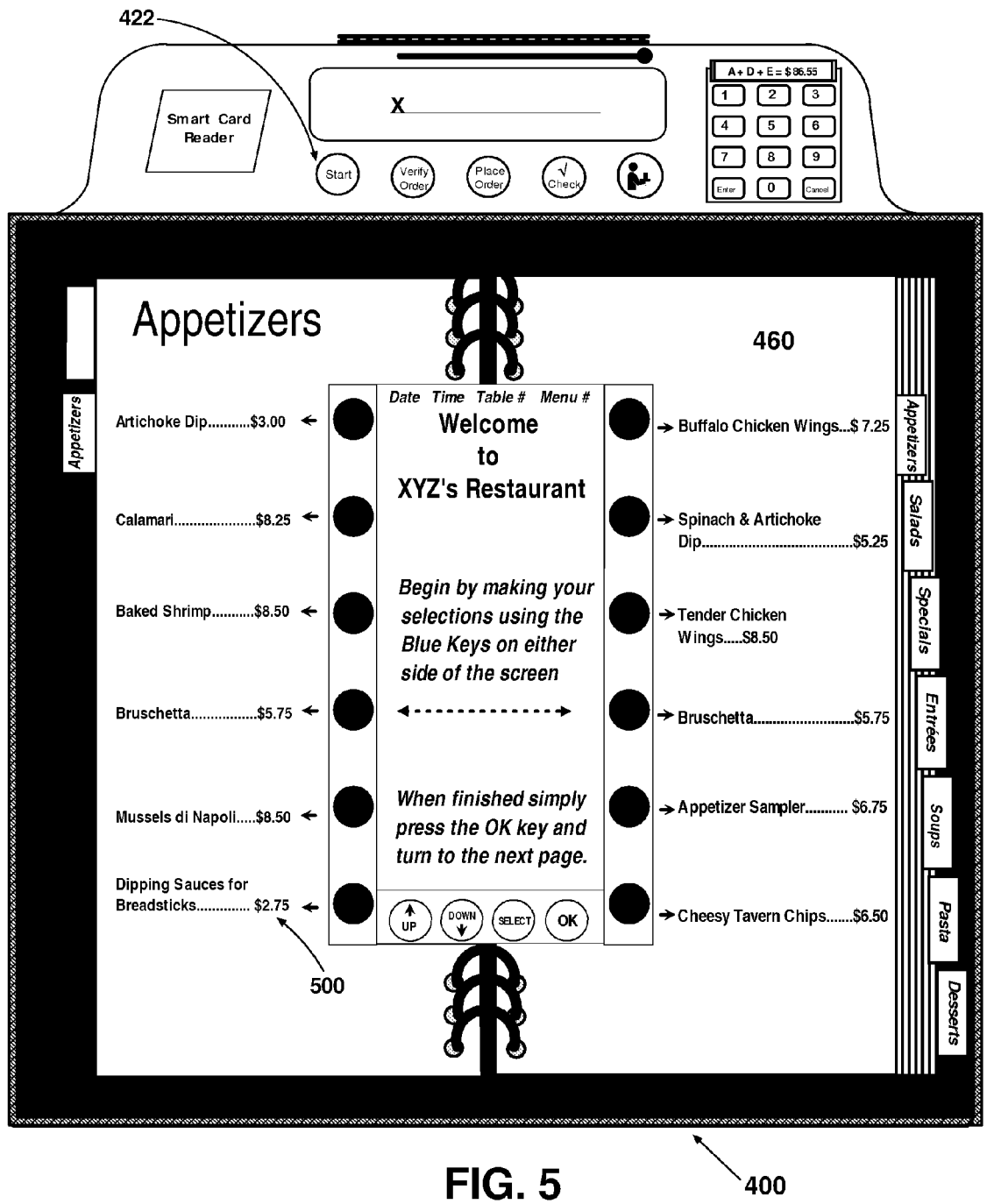

FIG. 5 shows a sample appearance of display 480 after customer presses the start button 422 and turns page 460 to the "Appetizer" section before making a selection. The Table #, Date, Time and Menu # appear on the display 480 along with the "Welcome to the XYZ Restaurant" Greeting and the Instructions to make selections using the Selection means 440 on either side of the display 480. The Greeting and Instructions disappear once the first selection is made.

Figure 6:
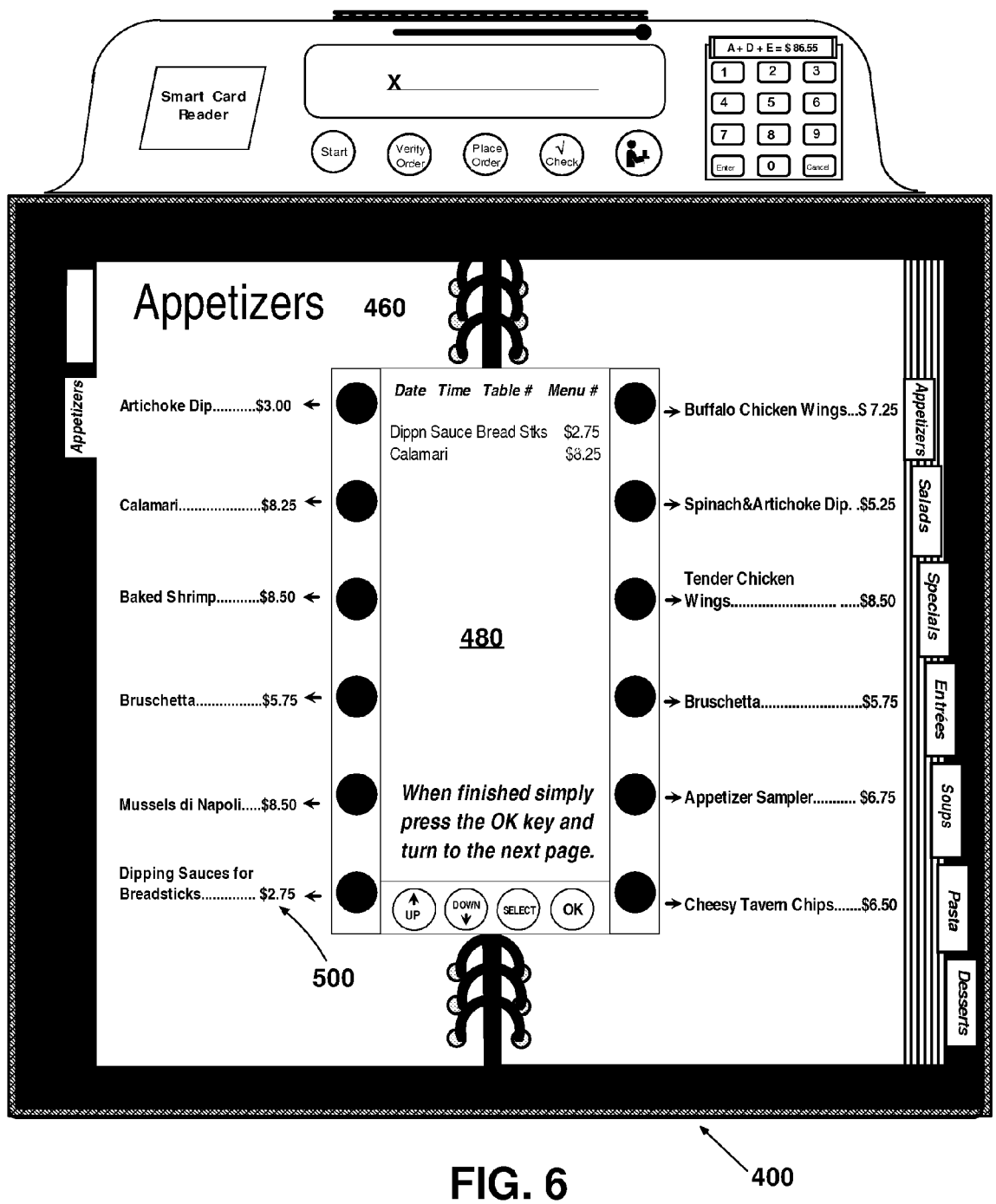

FIG. 6 shows the appearance of display 480 after a customer has made two selections 500 from the listed pages, here under Appetizer fare. An abbreviated or shortened description for each item appears on the display 480 with the price. Customer is instructed to press the OK selection key 474 and turn to the next page 460 to make another selection. Alternatively, the page can be turned without pressing the OK selection key 474.

Figure 7:
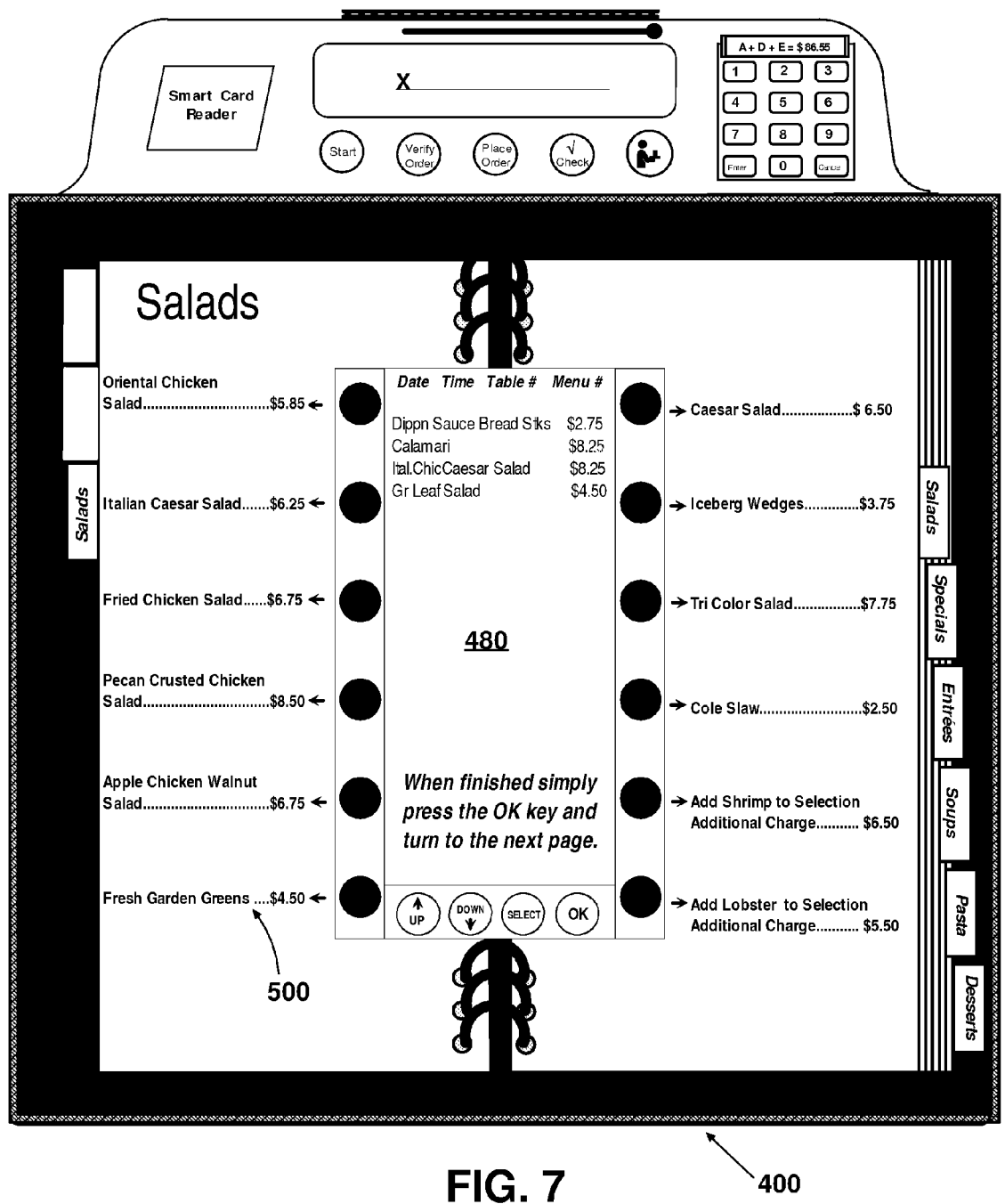

FIG. 7 shows the appearance of display 480 after a customer makes two selections 500 from the listed Salad fare. An abbreviated or shorten description appears on the display 480 with price. Once the Green Salad is selected a different screen appears on display 480 that allows the user to select options 800 (in this case, salad dressing) as shown in FIG. 8.

Figure 9:
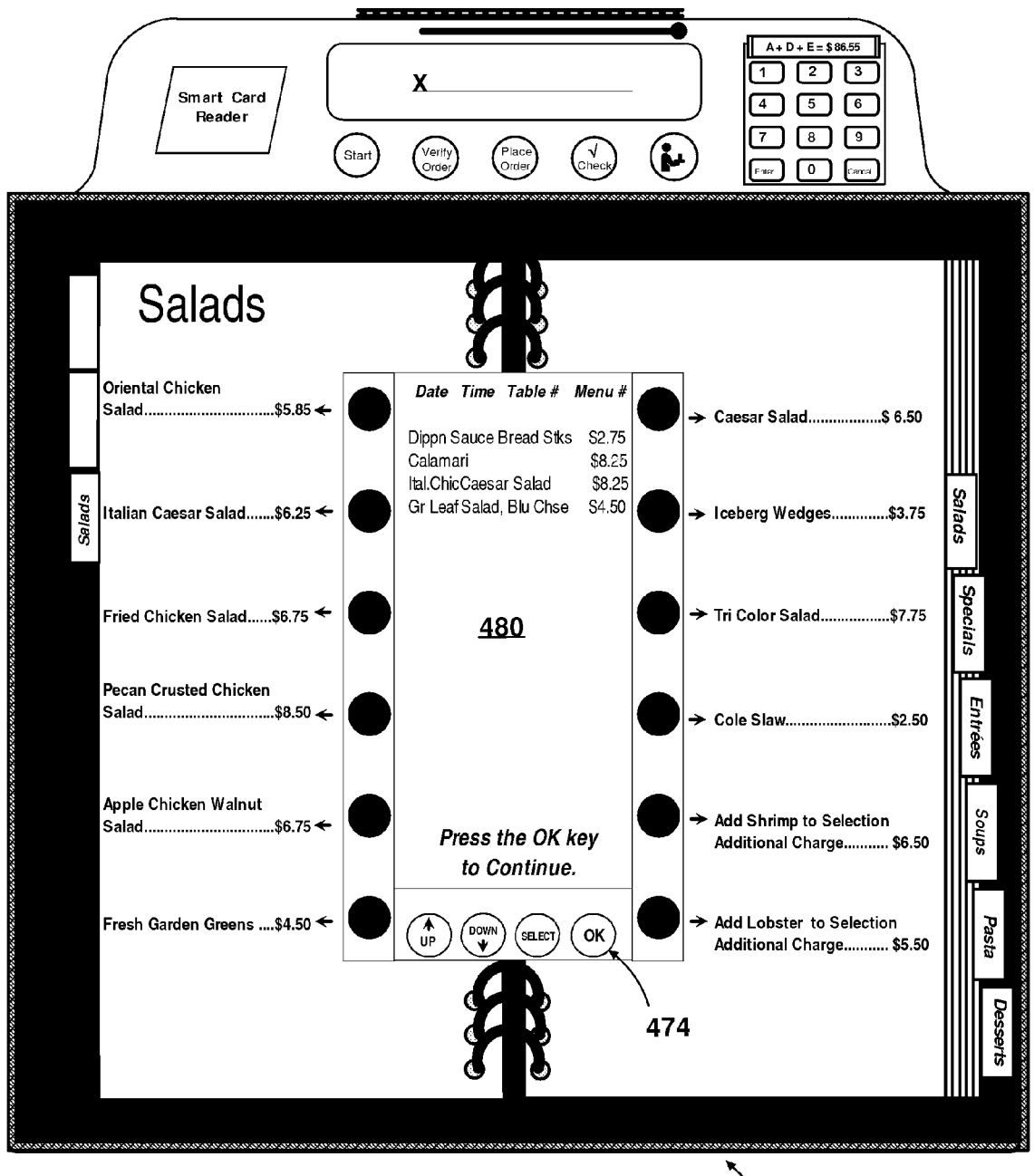

FIG. 8 shows the appearance of display 480 after a customer selects a menu item 500 that offers additional options 800 to accompany the previously selected item. Option 800 is displayed on the display 480 adjacent selection means 440, which, when pressed, will correspond to a selection of an option 800. Once the selection means 440 is pressed, some indication of an option's selection can be displayed, such as an increase in font or an underlining of the option 800. When the OK selection key 474 is pressed the display 480 as seen in FIG. 9 appears. FIG. 9 now shows the selection 500 with selected option 800 appended thereto. Navigation keys 471-474 can preferably be used to modify or delete previously selected items that are displayed on display 480.

Figure 10:
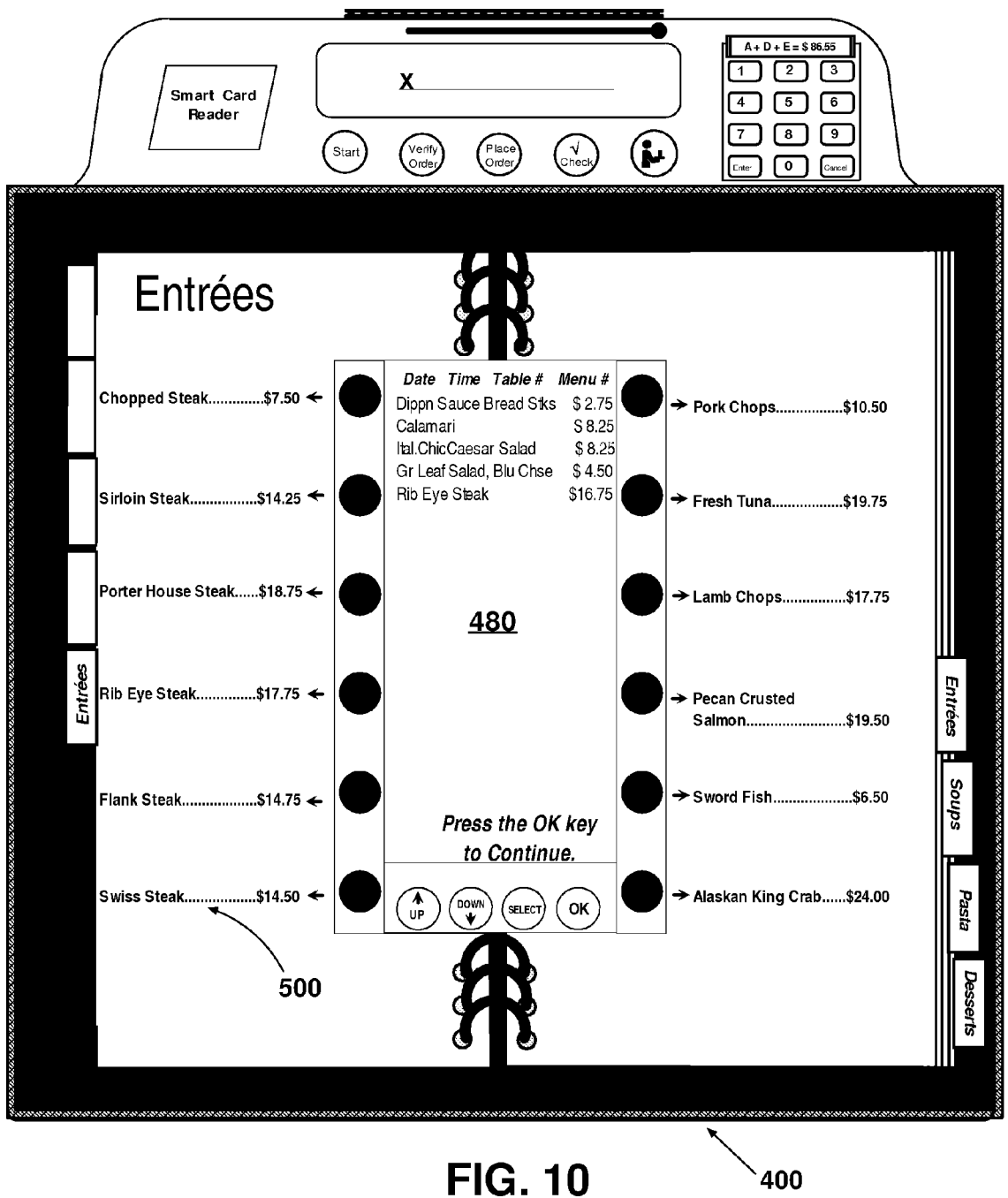

FIG. 10 shows the appearance of display 480 after a customer turns page 460 to Entrees page and makes a selection. As before, an abbreviated or shorten description appears on the display 480 with price. Whenever a beef item is selected, cooking and topping options appear.

Figure 11:
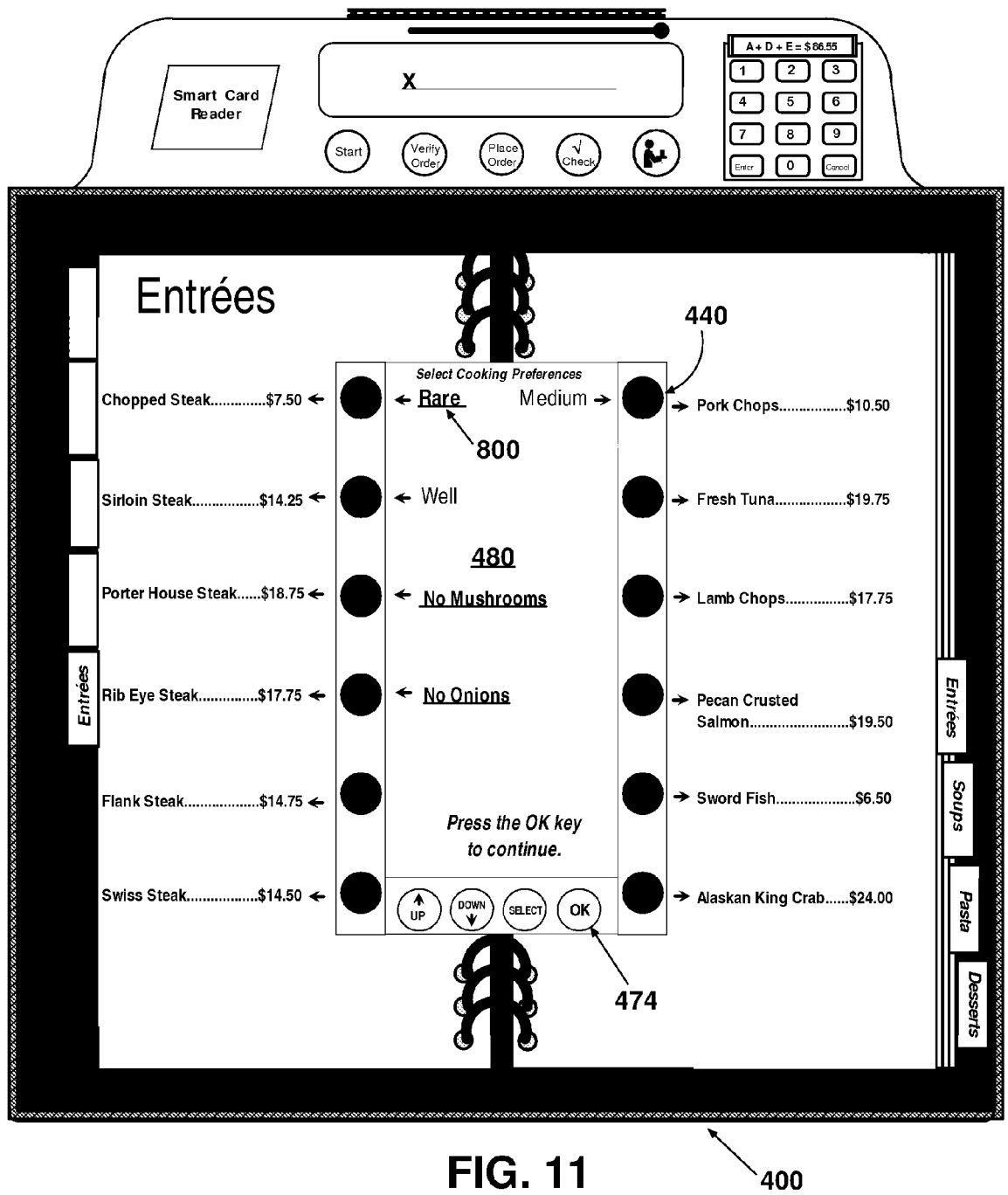
Figure 12:
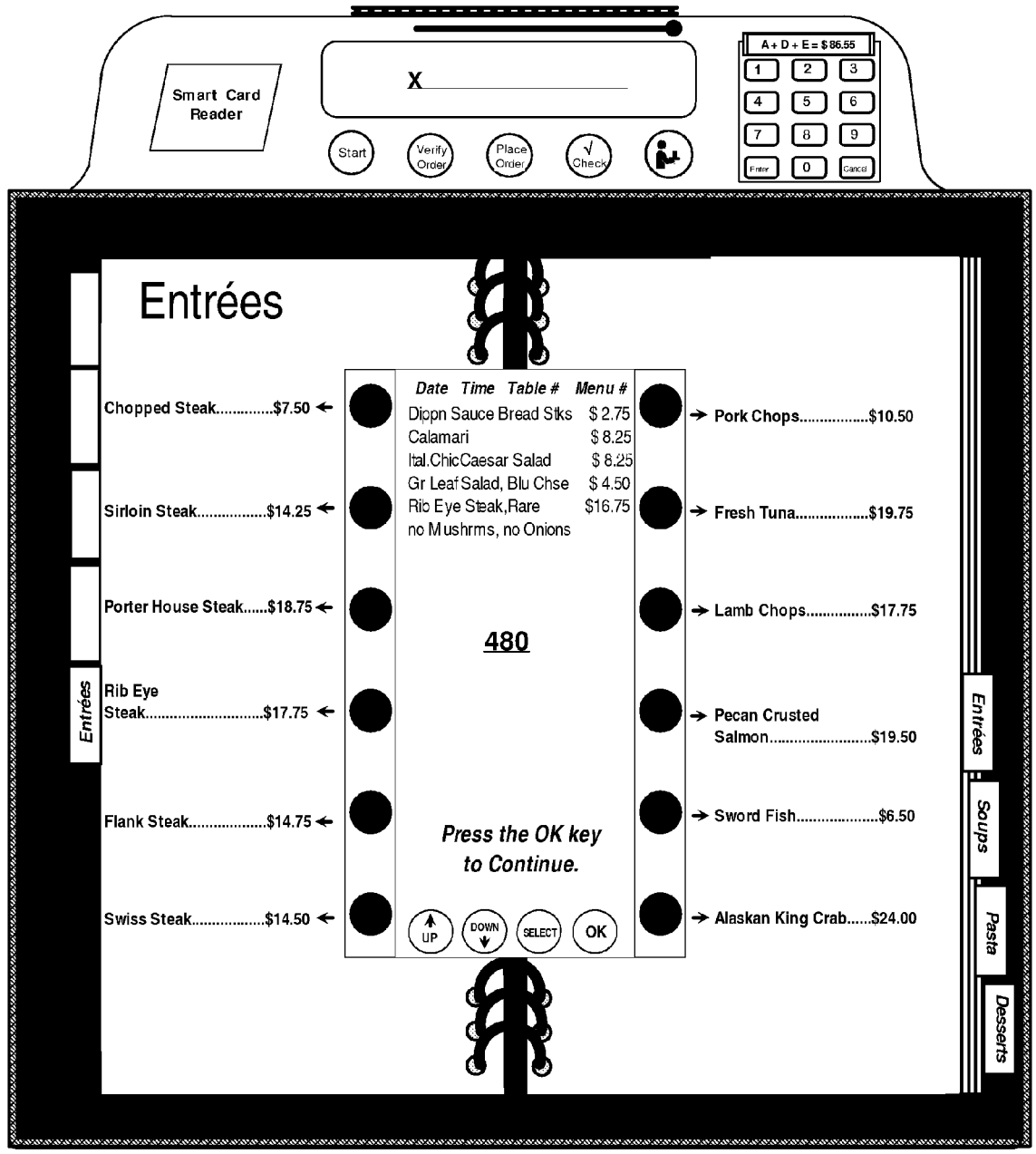

The customer uses the selection means 440 to choose the desired cooking level and toppings options 800 listed on the display 480 next to selection means 440. Once the selection means 440 is pressed, some indication of its selection can be displayed such as increased font or underlining. FIG. 11 shows the appearance of display 480 after a customer makes three selections from the list of options 800 using the selection means 440. Once all the options are selected, the OK selection key 474 is activated to move on to the screen as shown in FIG. 12.

Figure 13:
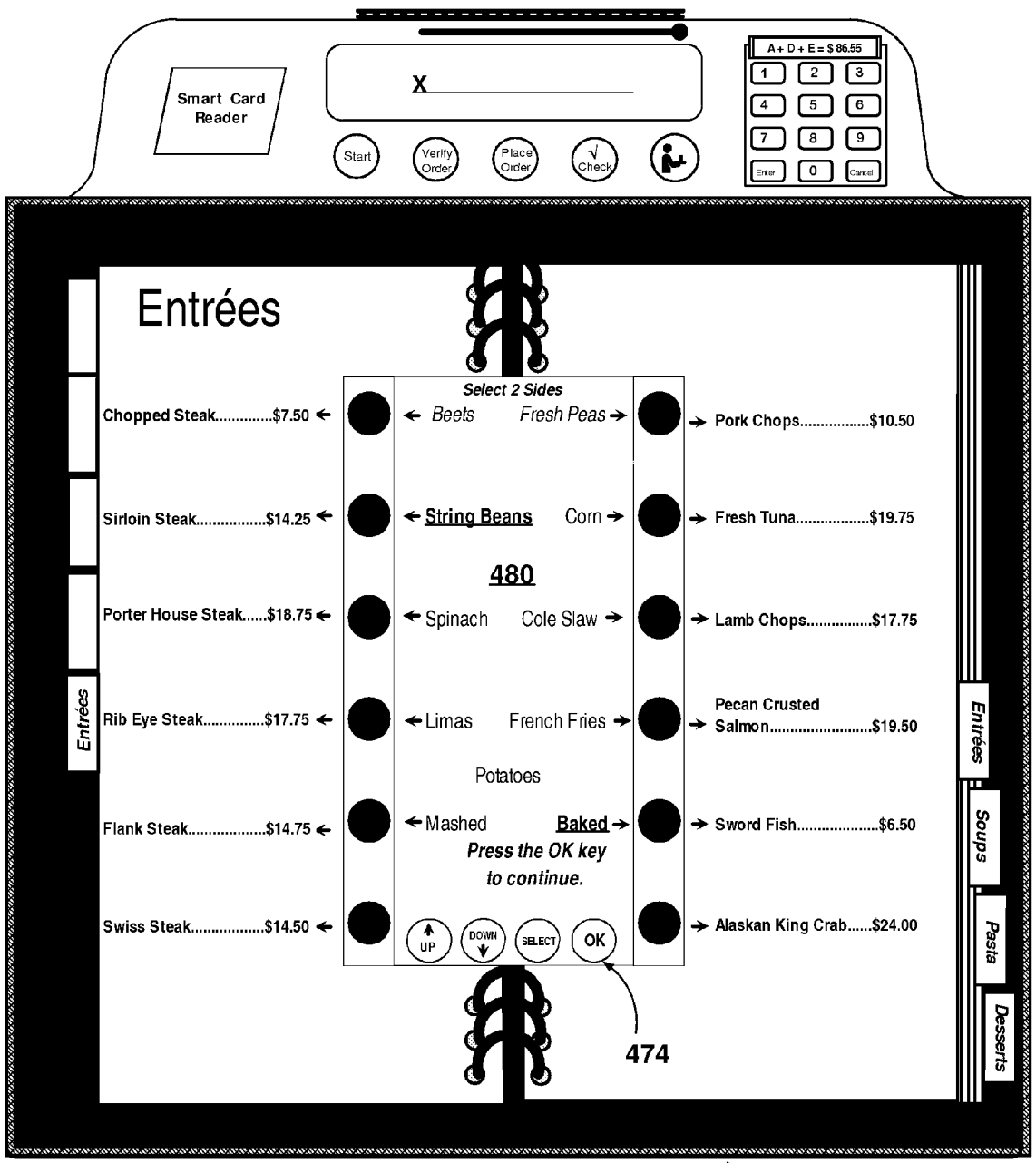

FIG. 13 shows another screen where available side dishes are displayed after selecting an entrée. The customer uses the selection means 440 to make 2 selections with some indication of their selection such as increased font or underlining.

Figure 14:
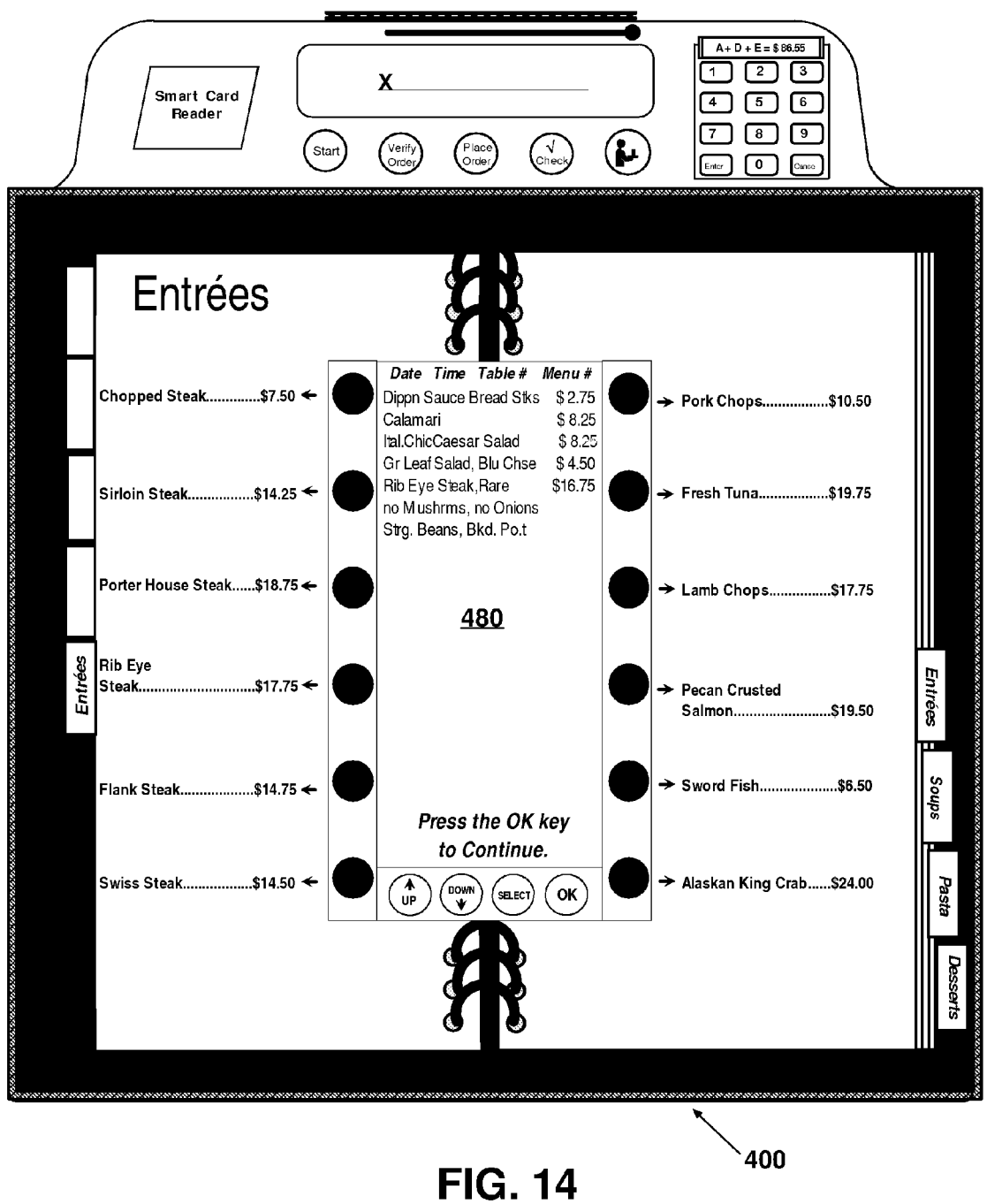

When the customer presses the OK selection key 474, confirmation is displayed as seen in FIG. 14.

Figure 15:
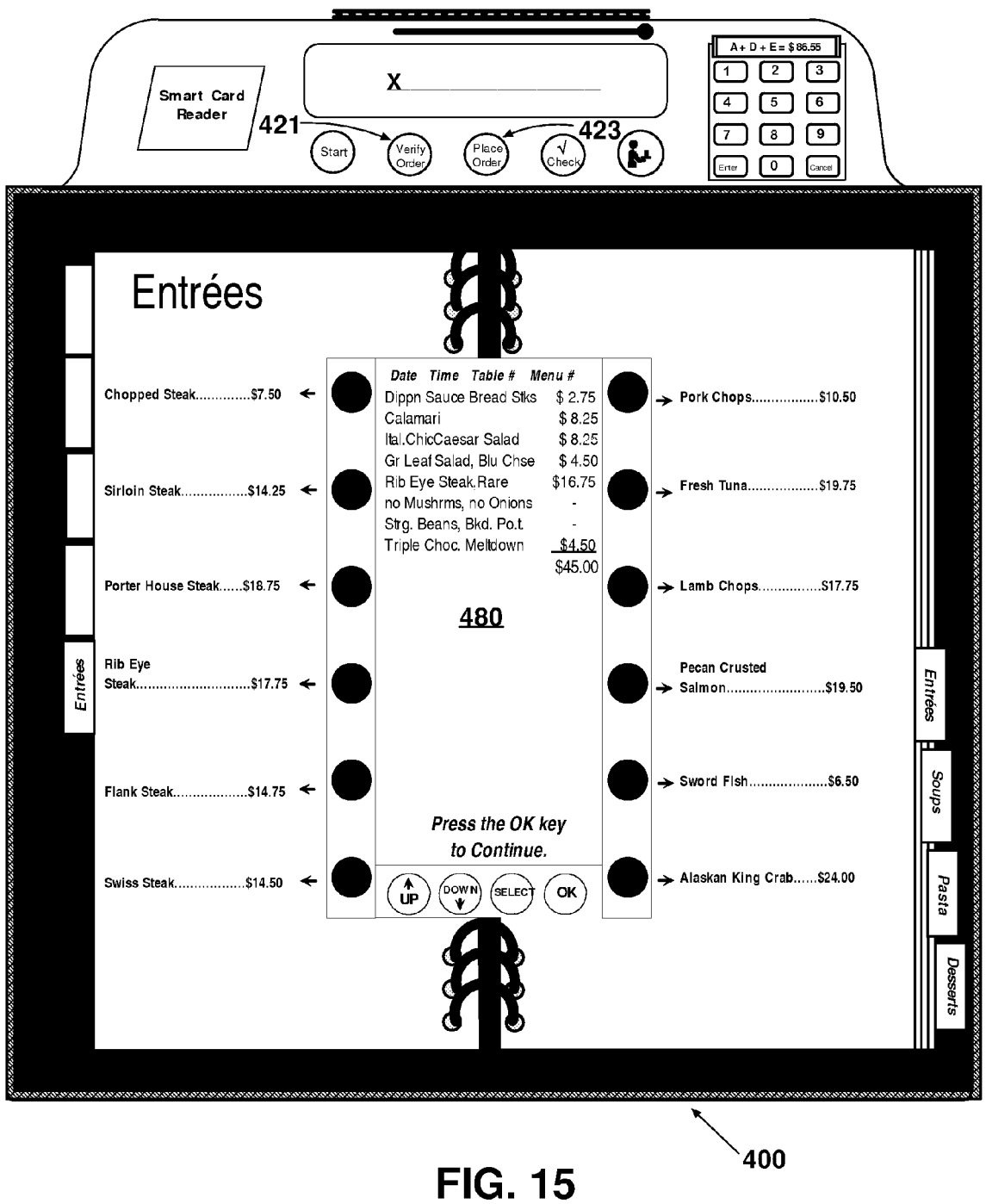

FIG. 15 shows a screen on display 480 after the customer finishes making all his selections and the verify order button 421 is pressed. The display 480 can then display the total order cost amount. If satisfied, the customer activates the place order button 423 to send the order directly to a receiving device 140 (discussed above).

Figure 17:
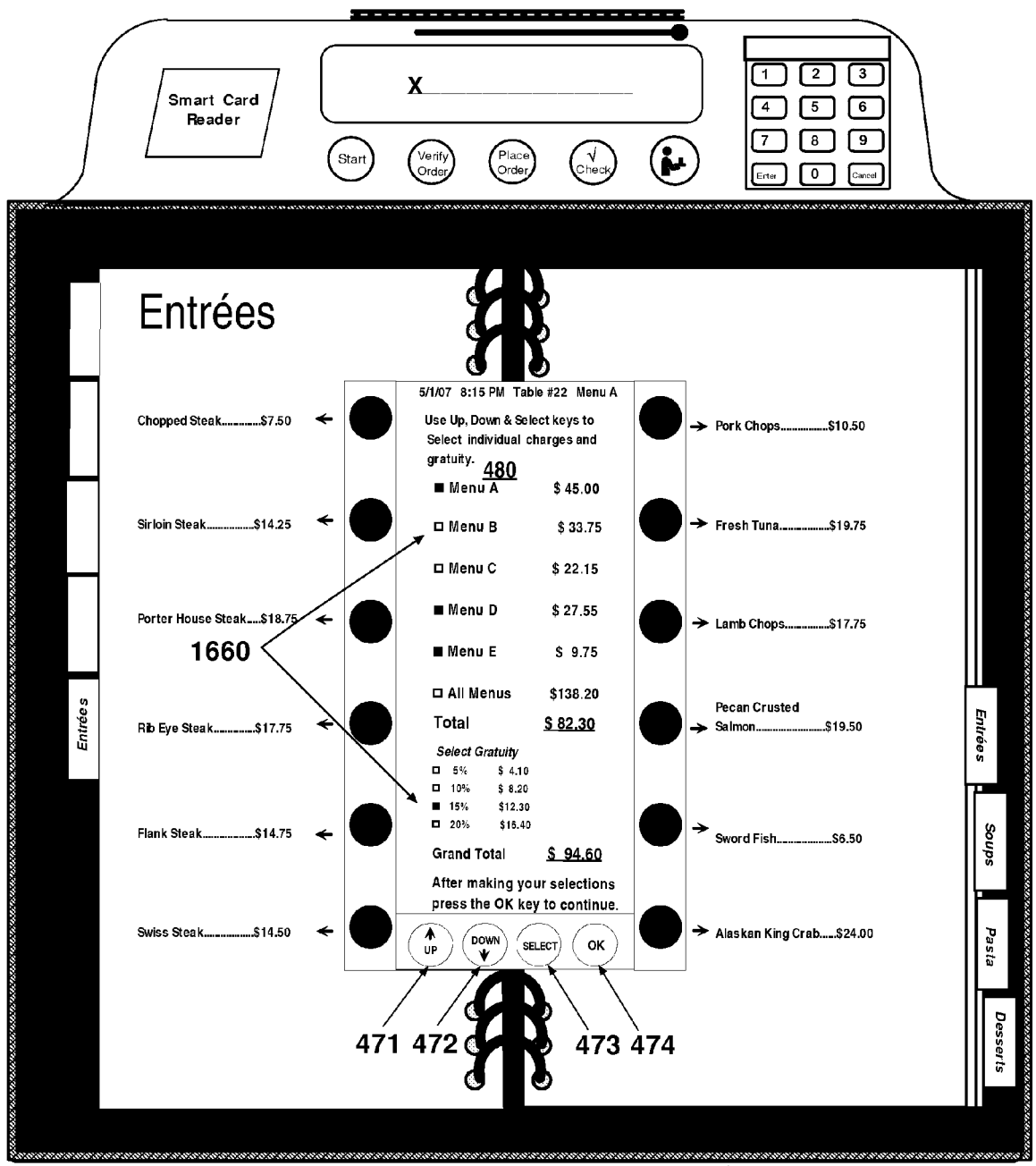
Figure 18:
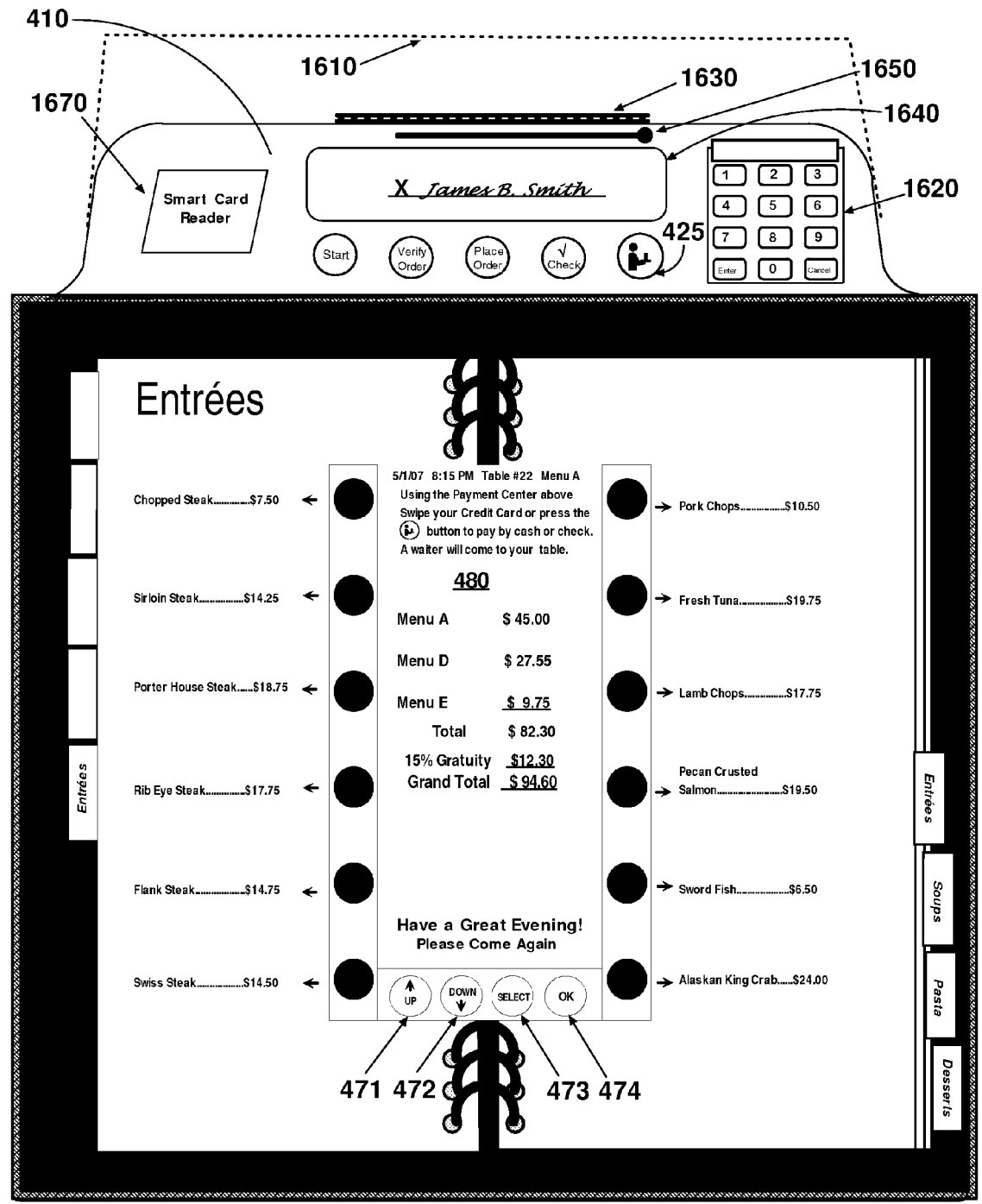

FIGS. 16-18 portray payment means 410 in greater detail. After the check request button 424 is activated, a summary of menu totals is listed on display 480. Instruction on display 480 say to use navigation keys 471, 472 and 473 to navigate through the payment selections 1660 including individual menus or the entire bill, and also the percentage gratuity to add to the bill.

FIG. 17 shows display 480 after a series of payment selections 1660 have been selected using the navigation keys 471, 472 and 473. Payment selections 1660 include a listing of selectable menus to pay for, an option to pay for all of the menus, and several gratuity percentage options. Once the appropriate options are selected, the "ok" navigation key 474 is depressed to go to a payment options screen.

FIG. 18 shows the payment options screen on display 480. Payment means 410 can be uncovered throughout the ordering process as is shown in FIGS. 4-18, or alternatively, can be provided with a cover 1610 (shown in ghost) that is raised to access the various features of payment means 410. Cover 1610 is preferably a transparent protective cover, but can optionally be made of any durable material.

Magnetic strip reader 1630 can be used to pay with conventional credit cards. Stylus 1650 is used to sign signature pad 1640 to authorize credit card payments. Alternatively, magnetic strip reader 1630 can be used to read a debit card, with alphanumeric keyboard 1620 being used to insert a pin number or other identifying information. The keyboard 1620 can also be used to calculate a custom gratuity, or to enter other text or numerical information. Smart card reader 1670 can be used for non-contact payment methods.

Other contact or non-contact payment devices can also be used, such as gift cards employing magnetic stripes, wireless payments from a smart-chip in a payment fob, near-field communication RFID devices, or wireless or cellular payment using a device such as a cellular phone or personal digital assistant (PDA).

The instructions on display 480 instruct a customer to use the payment means 410 above, or press the service button 474 to pay by cash or check. If the service button 474 is pressed, a waiter will go to the table to deliver a check.

The menu can be used to pre-pay for a meal before ordering, similar to the way payment at a gas-pump is pre-authorized before pumping. Payment can also be made using cash by calling the waitress using a service button located at or near the menu. Additionally, when there are multiple menus used at each table, it is contemplated that each menu can have the option to pay for the items purchased from other menus at the same table. Payment for items at another table can also be accomplished.

In one embodiment, there is a master menu that receives order information, including prices, from the other menus, and all order sending and payment is done through the master menu. This could provide better control over family or group ordering, and streamline the payment process.

The inventive concept for an electronic menu described above can be used in any field that may employ a menu, such as spa services, health and beauty care, movie or other performance theaters, concession stands, educational testing, means for conducting surveys, means for voting, hotel room or cruise line service linked to a customer's account, or any business offering a limited number of products that can be displayed on a menu.

A revenue generating scheme based on supply and maintenance of menu service is also contemplated. Under this scheme, a revenue stream is provided to the menu provider as a percentage of sales accrued through menu use. The menu use can be in any field where the menus could be used as detailed above.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. An electronic menu apparatus comprising:
    a series of physical pages, at least one of said physical pages listing a plurality of menu items;
    a grouping of stationary input devices that are physically arranged such that the location of each of the input devices is aligned with the location of one of said menu items on said at least one physical page;
    a display device for displaying information regarding input from the input devices, said display device configured to display menu item options so that the location of each menu item option on said display device is aligned with a corresponding stationary input device; and a transmitting device for transmitting input information to a remote location.

2. The apparatus of claim 1 further comprising at least one service button configured to alert a server.

3. The electronic menu apparatus of claim 1 wherein the information displayed on the display device includes advertisements.

4. The electronic menu apparatus of claim 1 wherein the input devices are discrete locations on a touch screen overlaying the display device.

5. The electronic menu apparatus of claim 1 wherein the menu further comprises a payment device.

6. The electronic menu apparatus of claim 1 wherein the information on said display device includes preferences, and wherein said input devices comprise membrane switches.

7. The menu apparatus of claim 1 wherein said display requests information from a customer.

8. The menu apparatus of claim 1 wherein said display is touch sensitive.

9. The menu apparatus of claim 1 comprising an audio feedback device.

10. The menu apparatus of claim 1 comprising a printer.

11. The menu apparatus of claim 1 wherein the menu is configured to provide identifying information to the remote location.

12. The apparatus of claim 1 wherein at least one of the stationary input devices is configured to select items from a plurality of the physical pages.

13. A method of ordering using an electronic menu apparatus comprising:

accessing a menu having a series of physical menu pages, a grouping of stationary input devices, a feedback mechanism including a display device, and a payment device wherein at least one of said physical pages lists a plurality of menu items;

selecting a desired menu item from one of the menu pages by activating one of said stationary input devices that is physically aligned with said desired item;

confirming a menu item was selected by referencing the feedback mechanism;

selecting a menu item option from the display device by activating one of said stationary input devices that is physically aligned with said menu item option; and sending information regarding the selected items to a remote location for processing.

14. The method of claim 13 further comprising the step of paying for selected items using said payment device.

15. The method of claim 13 wherein the at least one physical menu page is updated with a newly printed page and the input device is assigned a new menu item.

16. The method of claim 14 wherein there are multiple menus and the step of paying includes paying for items selected on a different menu.

17. The method of claim 13 further comprising turning at least one of said physical pages to update the data selected by one of the stationary input devices to a different set of menu items.

18. The method of claim 14 wherein the step of paying includes authorizing payment before the step of selecting an item.

* * * * *